United States Patent [19]
Grossmann

[11] 4,092,067
[45] May 30, 1978

[54] PRINTING METHOD

[75] Inventor: Walter Grossmann, Russikon, Switzerland

[73] Assignee: Gretag Aktiengesellschaft, Regensdorf, Switzerland

[21] Appl. No.: 713,196

[22] Filed: Aug. 10, 1976

[30] Foreign Application Priority Data

Aug. 14, 1975 Switzerland ............... 10605/75

[51] Int. Cl.² ............... G03B 27/32; G03B 27/74
[52] U.S. Cl. ............... 355/77; 355/68
[58] Field of Search ............... 355/71, 77, 68, 97, 355/41, 33, 34, 32, 35, 38

[56] References Cited

U.S. PATENT DOCUMENTS

| 2,800,834 | 7/1957 | Petry et al. ............... 355/68 X |
| 3,049,967 | 8/1962 | Duerr ............... 355/38 |
| 3,455,632 | 7/1969 | Neale et al. ............... 355/77 |
| 3,575,702 | 4/1971 | Huber ............... 355/68 X |
| 3,677,641 | 7/1972 | King et al. ............... 355/68 X |
| 3,708,676 | 1/1973 | Hubol et al. ............... 355/38 X |
| 3,724,947 | 4/1973 | Paulus ............... 355/68 X |
| 3,744,901 | 7/1973 | Harter ............... 355/68 X |
| 3,790,275 | 2/1974 | Hubol et al. ............... 355/68 |
| 3,888,580 | 6/1975 | Amano et al. ............... 355/77 X |

FOREIGN PATENT DOCUMENTS

| 2,226,576 | 12/1973 | Germany ............... 355/68 |
| 1,366,162 | 9/1974 | United Kingdom ............... 355/68 |

*Primary Examiner*—Donald A. Griffin
*Attorney, Agent, or Firm*—Burns, Doane, Swecker & Mathis

[57] ABSTRACT

A method of controlling exposure in the production of photographic prints by scanning an original point-by-point and determining the neutral density of each point of the picture, the densities being processed to provide exposure data to control the exposure of sensitized paper to produce a print from the original. To provide the optimum print quality as required by this method, the picture area of the original is divided up into zones, each of which is at least two picture points, the density values obtained by scanning the original are processed with a density value of a point in a reference picture to provide intermediate density values for each zone in accordance with processing instructions which vary from zone to zone, the intermediate values then serving to form an end density value to control the exposure of the print material. When printing in color the color original is scanned to provide density values in each of the three primary colors at each point of a zone and the three color density signals are then similarly processed to provide the exposure data for the color print material.

20 Claims, 3 Drawing Figures

PRINTING METHOD

FIELD OF THE INVENTION

This invention relates to a method of controlling exposure in the production of photographic prints.

It has been found from experience that originals, usually negatives, which are of similar density structure are often printed in very different ways depending upon whether the main feature of the photograph (for example people) is in the light or dark area of the picture.

In the case of a flashlight photograph, the part which is important to the picture is generally in the dense areas of the negative or may even be the densest area since, for example, the face of a person being photographed is illuminated directly by the flashlight. In such cases it is important that the dense areas of the negative are correctly reproduced in making the print. In a street scene, on the other hand, where the street is a narrow shady street, the important feature of the photograph is usually in the shade parts, i.e. in the areas of low negative density, while, for example, a portion of the sky possibly visible at the edge of the picture and causing a high density in the negative is not important to the picture. A negative with such a subject must therefore have a greatly reduced exposure for correct reproduction of the area important to the picture, in comparison with a flashlight photograph having substantially equal total density.

In order further to reduce the rejection rate, even though it is already very low in modern automatic printers, it is absolutely essential that originals for printing should be distinguished by subject by means of suitable criteria and dealt with accordingly in different ways. Numerous proposals have already been disclosed in this respect but although they provide a certain improvement in quality they only partly solve the above problem and are not completely satisfactory in every case.

Prior Art

German patent specification No. 1,042,374 discloses a printing method in which the density of the original is scanned point-by-point in the three primary colours and weighted averaging of the resulting discrete density values produces area densities from which the filter combination for exposure of the material for printing is determined as in the known processes having integral density measurement. In the case of weighted averaging, the density values at points scanned in the central area of the original are evaluated to a greater degree than those in the edge area of the original. This known method makes use of the empirical fact that the main feature of the photograph is generally at the centre. Although a certain improvement in quality can be obtained given suitable selection of the weighting coefficients, it is not sufficiently sensitive to give perfect prints every time in the above-described extreme cases.

It is also known, for example, from German Auslegeschrift 1,772,475 and German Offenlegungsschrift No. 2,143,023 to divide the picture area of the original into an edge area which is closed or divided into two halves, and into a plurality of small partial areas at the centre of the picture, measure the original separately in each discrete area, and effect exposure classification into well-known categories from the discrete measured results. In the method according to the German Auslegeschrift No. 1,772,475, the classification includes substantially only two values, viz., the average density of the total edge area and the maximum density of the central partial areas. In the method according to German Offenlegungsschrift No. 2,143,023, the classification is somewhat more refined inasmuch as the average densities of the two edge area halves are considered separately. Although these two known methods already give some improvement in the yield of qualitatively satisfactory copies as compared with the integral density measurement method and as compared with the method according to German Patent Specification No. 1,042,374, they cannot satisfy all practical requirements since the number of parameters concerned in the classification is only very small.

Finally, German Offenlegungsschrift No. 2,142,176 discloses an exposure control method in which the density of the original is scanned point-by-point and in which, in particular, those density values originating from a special area of the original are utilized to determine the exposure data. The special area is individually selected with each original and comprises that area of the original which is important to the picture. To determine the exposure data the mean density, maximum density and mean contrast are evaluated from one scanned point to the next of the selected area and, if required, the mean density of the whole original is evaluated. With this method, exposure of the original can be very satisfactorily adapted to the specific subject conditions of each individual original by suitable selection of the special scanned area, but such selection must be made visually. This method is therefore unsuitable for automatic operation. If, on the other hand, as also proposed in German Offenlegungsschrift No. 2,142,176, the special scanned area is fixed for all originals, for example over the central area of the original, then the visual stage of the method can be obviated but then the values applied in this method and included in calculating the exposure data are not always sufficient for the production of satisfactory quality prints.

OBJECT OF THE INVENTION

It is therefore the object of the invention to provide a suitable exposure control method for the automatic production of optimum photographic prints from practically any type of original and, as far as possible, independently of the subject, with tolerable expenditure in equipment.

SUMMARY OF THE INVENTION

The method which satisfies this object is characterised by the picture area of the original being divided up into zones, each of which comprises at least two picture points. Intermediate values are formed for each zone from the density values of the picture points in that zone, and from the density value in a reference picture point, common to all the zones in accordance with instructions which vary for each zone, and forming from the intermediate values an end value governing the determination of the exposure data.

The conditions for accurately determining the density distribution of the original to such an extent that the importat area of the picture of practically any subject receives the optimum exposure are thus created by dividing the original into a number of zones and by individually evaluating the density values within these zones by reference in each case to a density value which is equal for all the zones.

BRIEF DESCRIPTION OF THE DRAWINGS

A preferred embodiment of the invention is explained in detail hereinafter with reference to the accompanying drawings wherein.

DETAILED DESCRIPTION OF PREFERRED EMBODIMENT i, colours

Figure 1:
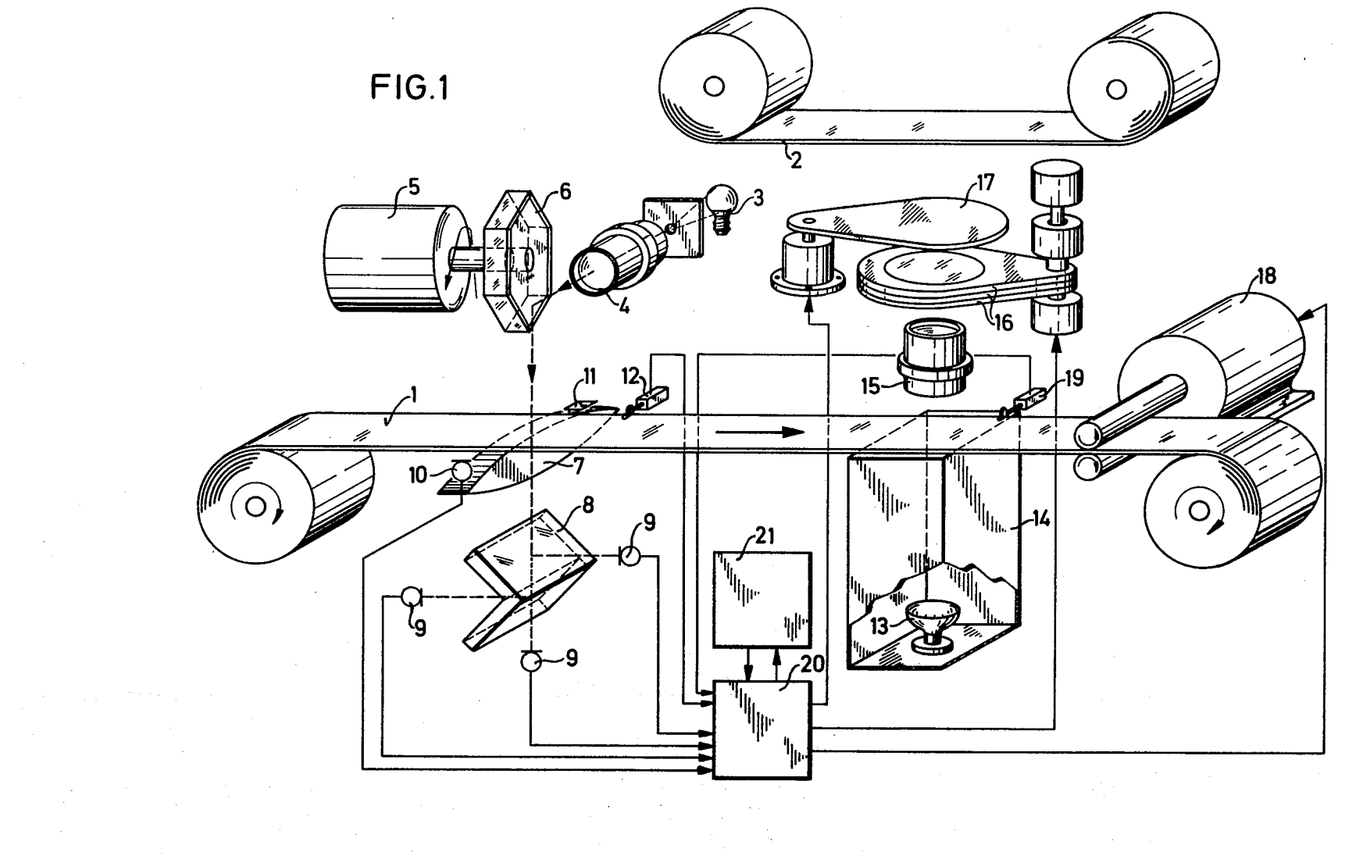
FIG. 1 is a simplified illustration of a printer which can be operated in accordance with the method of the invention.

The printing apparatus illustrated in FIG. 1 comprises mainly two stations through which passes a master 1 in the form of a strip, hereinafter referred to as the "film". The film is scanned in the first station and a strip of photosensitive material 2, generally a colour paper, is exposed in the second station.

The scanning station comprises a light source 3, an optical system 4, a mirror wheel 6 driven by a synchronous motor 5, a condenser 7, a beam splitter 8 and three photocells 9 each sensitive to a different one of the three primary colours. The mirror wheel 6 deflects the beam from the optical system 4 transversely of the longitudinal direction of the film. Another photo-cell 10 is disposed laterally adjacent the film 1 and is illuminated once at the beginning of each scanning line and serves for line synchronization. A reference cell 11 of specific density is disposed on the opposite side of the film and is also illuminated once per scanning line and serves for calibration of the measuring system. A notch sensor 12 responds to positioning notches at the edge of the film to detect the film position.

The exposure station is the same as in an ordinary printer and comprises a light source 13, a lightproof well 14 with a light diffuser, a projection optical system 15, a servo-actuated filter set 16 and a shutter 17. The exposure station also contains a stepping motor 18 to transport the film and another notch sensor 19.

To control the sequence of operations in the two stations the latter are connected to an evaluating and control station 20 which is in turn connected to a process computer 21, for example a Nova 1200 computer made by Messrs. Data General.

In the scanning station the film 1 is scanned by the scanning system, which is known per se, in the three primary colours frame by frame, point-by-point in lines extending substantially transversely of the longitudinal direction of the film. The transition from one line to the next is produced by the film advance taking place between two exposure stages in the exposure station. The scanning lines are split up into discrete points electronically at the evaluation station 20. The mirror wheel 6 and the film transport stepping motor 18 are synchronized by means of the signals produced by photo-cell 10. Since the distance between individual frames on the film 1 may not always be constant, the scanning beam may not be situated exactly between two frames when the film is stationary, and in consequence the beam may repeatedly scan the same frame line. However, the measured values derived from one scan only of the same frame line are taken into account while measured values resulting from scanning areas outside the frames are completely disregarded. This is achieved by feeding to the evaluation station 20 signals from the notch sensor 12 and the signals controlling the film transport stepping motor 18. The reference cell 11, which is scanned at the end of each line yields a constant reference value by means of which the measuring system is continuously calibrated so as to avoid any drift.

The density values of the discrete measured points of each frame obtained in this way are evaluated by the process computer 21 in accordance with instructions which will be described hereinafter, and the control values for the filter set 16 and the exposure time are determined therefrom. The values so obtained are stored until the frame in question reaches the exposure station. The notch sensor 19 causes the film to stop when the frame is in the correct position. The exposure values are then automatically adjusted and exposure takes place in a manner known per se on the additive or subtractive principle.

As already stated, the transparency or density at a given number of measuring points in each frame of the original is measured in respect of the three primary colours: red, green and blue. The output signals of the photo-cells 9 proportional to the transparency of the measured points are first converted to density values in the process computer 21 by means of a logarithmic analog-digital converter. The neutral density is then determined in respect of each scanned point by weighted averaging from the three colour density values. The averaging procedure is such that the density in the primary colour blue has the weakest effect while the density in the primary colour green has the strongest effect. The proportions of the colours blue, green and red are preferably in the ratio 1:5:4 approximately. Of course the neutral density could be also detected directly by means of another photo-cell, i.e. avoiding the roundabout route using the three colour densities values.

The neutral density values $D_m$ in the discrete scanned points are then evaluated to control the neutral density of the print. To this end, the average density $D_I$ of the whole original is formed and the mean value $(D_{max} + D_{min})/2$ is determined from the maximum density and the minimum density of the original. The average density and the density mean value are added in accordance with the formula:

$$D' = A \cdot D_I + (1-A)(D_{max} + D_{min})/2$$

Factor $A$ is between 0 and 1, preferably between about 0.4 and 0.9.

The contrast $K_m = (D_m - D_{min})$ is also determined at each scanned point with respect to the minimum density $D_{min}$ of the original and is converted to a weighted contrast $\bar{K}_m$ as an intermediate value by multiplication with a weighting factor C. The weighting factor C is not constant over the entire area of the original, but depends on the geometric position of each scanned point. The frame area on the original is divided up into five concentric zones (a larger or smaller number is possible), each zone having a different weighting factor C although each factor is constant within each zone. The factor associated with the innermost zone is greater than 1, the factor associated with the outermost zone is always smaller than 1 and the factors associated with the intermediate zones have values intermediate the values of the factors of the innermost and outermost zones. The frame area may, for example, be divided up into 10 × 10 elementary areas, the elementary areas being combined to form four annular zones each of the width of an elementary area and a central zone consisting of four elementary areas. The values of the factors preferably decrease from the innermost zone of the original to the outermost. One advantageous gradation of the weighting factors C is the following numerical sequence for example: 1.5 — 1.4 — 1.3 — 1.0 — 0.7. The weighting factor gradation naturally depends on the division of the image area into the individual zones. Generally, the weighting factors should not be more than 2 and not less than 0.5.

The maximum intermediate value or weighted contrast $\bar{K}_{max}^{c>1} = [C.(D_m-D_{min})]_{max}^{c>1}$ of all the zones with $C>1$ and the maximum weighted contrast $\bar{K}_{max}^{c>1} = [C.(D_m-D_{min})]_{max}^{c<1}$ from all the zones with $C<1$ are then determined, the difference $\bar{K}_{max}^{c>1} - \bar{K}_{max}^{c<1}$ is formed and multiplied by a constant F, which is between 0.5 and 2, preferably between 0.8 and 1.2, or which may also be 1. The resulting value is then added to the value D' and finally yields the end value D which governs the determination of the exposure data:

$$D = A D_I + (1-A)(D_{max} + D_{min})/2 + F$$
$$\cdot [[C \cdot (D_m - D_{min})]_{max}^{c>1} - [C(D_m - D_{min})]_{max}^{c>1}]$$

According to the above-described embodiment of a method according to the invention, the contrasts in the discrete scanned points are referred to the minimum density $D_{min}$ of the original. A different value, for example the average density $D_I$, or the density D', could be used for the purpose. In that case, the weighting factors C would have to be adjusted accordingly.

The summand containing the weighted contrasts for the end value D governing the exposure control depends very much on the subject and therefore yields subject-oriented corrections. It will readily be seen that this summand increases in value as the maximum-density areas approach the central zone of the original, and decrease in value as they recede therefrom. In the case of flashlight photographs, for example, in which the dense areas in the negative usually coincide with the area which is important in respect of the subject and are situated in the middle of the frame, this results in a lengthening of the exposure time as compared with a normal negative of the same average density. On the other hand, negatives in which the central parts of the picture are flat while the maximum density values may be situated in the edge zones, as is the case, for example, with shady street scenes, receive a shorter exposure during printing. Thus those areas of the original which are important in terms of the photographic picture are correctly exposed in practically every case and independently of the subject.

Athough the above description of an exposure control process according to the invention refers to negatives as the original, those versed in the art will be aware that the process can be applied in principle to printing from positive originals. For this purpose, only the maximum and minimum densities in the formulae have to be changed over accordingly.

In making coloured prints the colour balance must also be controlled in addition to the neutral density, the colour balance meaning the relationship between the exposure intervals for the three primary colours. For this purpose, the difference between the density values of two primary colours e.g. blue and green, and the difference between the density values of one of these two primary colours and the third primary colour, e.g. green and red, are formed in the process computer for each scanned point and are compared with the corresponding density value difference of a reference original corresponding to the average of a relatively large number of originals. The reference original has a homogeneous density distribution over the entire picture area and therefore determines each single density value in the three primary colours. These three density values are contained in a store in the process computer 21. The following formulae express the comparison between the original which is to be printed and the reference original:

$$D_B - D_G \leq D_{N_B} - D_{N_G} \pm d_1$$

$$D_R - D_G \leq D_{N_R} - D_{N_G} \pm d_3$$

The magnitude of the constants $d_1$ and $d_3$ is about 0.1 to 0.2 density units.

This density difference comparison forms a selection criterion as to whether the particular scanned point is or is not used to determine the colour corrections for the exposure values. The scanned point counts as valid for consideration only if both the above conditions are satisfied.

Instead of this relatively simple criterion, it is possible to use a somewhat more complicated one for which the formulae may be expressed as follows:

$$D_i - \frac{aD_i + bD_j + cD_k}{a+b+c} \leq D_{N_i} - \frac{aD_{N_i} + bD_{N_j} + cD_{N_k}}{a+b+c} \pm d_1$$

$$D_j - \frac{aD_i + bD_j + cD_k}{a+b+c} \leq D_{N_j} - \frac{aD_{N_i} + bD_{N_j} + cD_{N_k}}{a+b+c} \pm d_2$$

$$D_k - \frac{aD_i + bD_j + cD_k}{a+b+c} \leq D_{N_k} - \frac{aD_{N_i} + bD_{N_j} + cD_{N_k}}{a+b+c} \pm d_3$$

In these formulae, the indices $i$, $j$ and $k$ denote the three primary colours, the index N the reference original and $a$, $b$ and $c$ are constant weighting factors. The constant $d_2$ is of the same order of magnitude as $d_1$ and $d_3$. The weighting factors $a$, $b$ and $c$ are normally in the range from 0 to 1. Advantageously, their relationship to one another does not exceed 10:1. For most cases, however, it is sufficient for all the weighting factors to be equal, and in consequence the selection criterion for the discrete scanned points is as follows:

$$D_B - \frac{D_B + D_G + D_R}{3} \leq D_{N_B} - \frac{D_{N_B} + D_{N_G} + D_{N_R}}{3} \mp d_1$$

$$D_G - \frac{D_B + D_G + D_R}{3} \leq D_{N_G} - \frac{D_{N_B} + D_{N_G} + D_{N_R}}{3} \pm d_2$$

$$D_R - \frac{D_B + D_G + D_R}{3} \leq D_{N_R} - \frac{D_{N_B} + D_{N_G} + D_{N_R}}{3} \pm d_3$$

where the letters D, G and R denote the primary colours blue, green and red.

For practical purposes it is sufficient for at least two of these conditions to be satisfied although it is advantageous for the scanned points used to determine the exposure values to satisfy all three conditions.

If the density differences of a scanned point differ from the corresponding differences of the reference original by more than the tolerances determined by the constants $d_1$ to $d_3$, it means that the scanned point in question represents a relatively strongly coloured image area which is indicative of a colour dominance and should not therefore be used for colour correction value determination. In this way the influence of colour dominance on the colour correction values is greatly reduced.

In the case of originals having a very large proportion of strongly coloured picture points, for example subjects containing water and sky, there is the risk that there will be only very few, if any, scanned points satisfying the above selection criteria. For this reason, there is a specific minimum number of measured values which must be usable for evaluation. If the original does not have sufficient scanned points satisfying the selection criteria, the three density values of the reference original are substituted for each scanned point short of the specific minimum number. An under-correction occurs in this way since as the number of scanned points which can be evaluated decreases, the colour balance of the reference original increasingly becomes the basis for the colour correction. Since, on average, each original has a specific number of strongly coloured image points, the minimum number of evaluated measured values is not adjusted to the total number of all the scanned points but only to a certain percentage thereof. For example, this percentage may be about 30 to 70, advantageously about 50. The effect of this is that for up to 70 to 30% of the scanned points a full colour correction is carried out while it is only when the number of scanned points that can be evaluated is less than 30% to 70% that the values of the reference original are used for supplementary purposes so that there is finally an under-correction.

The measured values left after those scanned points which do not satisfy the selection criteria have been separated, are converted in manner known per se to area densities.

$\overline{D}_{i,j,k}$ for the individual colours $k$, $j$ and $k$ in the process computer in accordance with the program $$\overline{D}_{i,j,k} = \left( \sum_{r=1}^{R} e_r \right)^{-1} \cdot \sum_{r=1}^{R} e_r D_{r_{i,j,k}}$$

where R denotes the number of scanned points that can be evaluated or the specific minimum number. The weighting factors $e_r$ are generally all equal but if necessary they can all be different. For example, on analogy with the density control it is possible to take a central zone of the original into account to a greater degree than peripheral zones. Consequently, those parts of the original which are important to the photograph and which are situated in the centre of the picture also have a greater influence on the colour balance than those parts which are less important to the picture.

The area densities determined in this way are advantageously used only for colour control, i.e. to control the relationship between the three partial exposures in the individual primary colours. To this end, the three differences:

$$\Delta_{i,j,k} = \overline{D}_{i,j,k} - \frac{\overline{D}_m + \overline{D}_j + \overline{D}_k}{3}$$

are formed and from them the exposure values are determined for controlling the colour balance.

Figure 2:
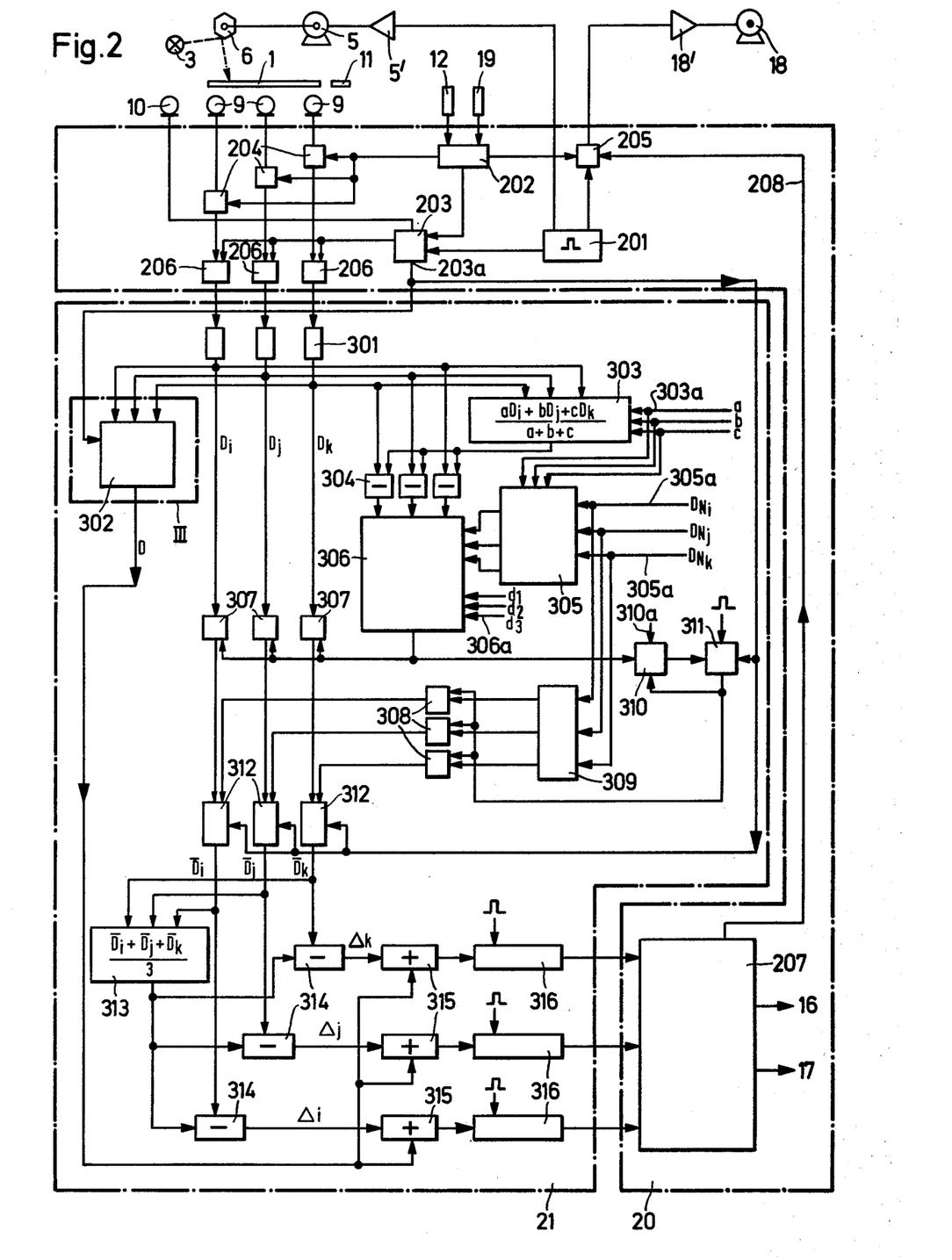
FIG. 2 is a detailed block schematic diagram of the exposure control system for the printer shown in FIG. 1
Figure 3:
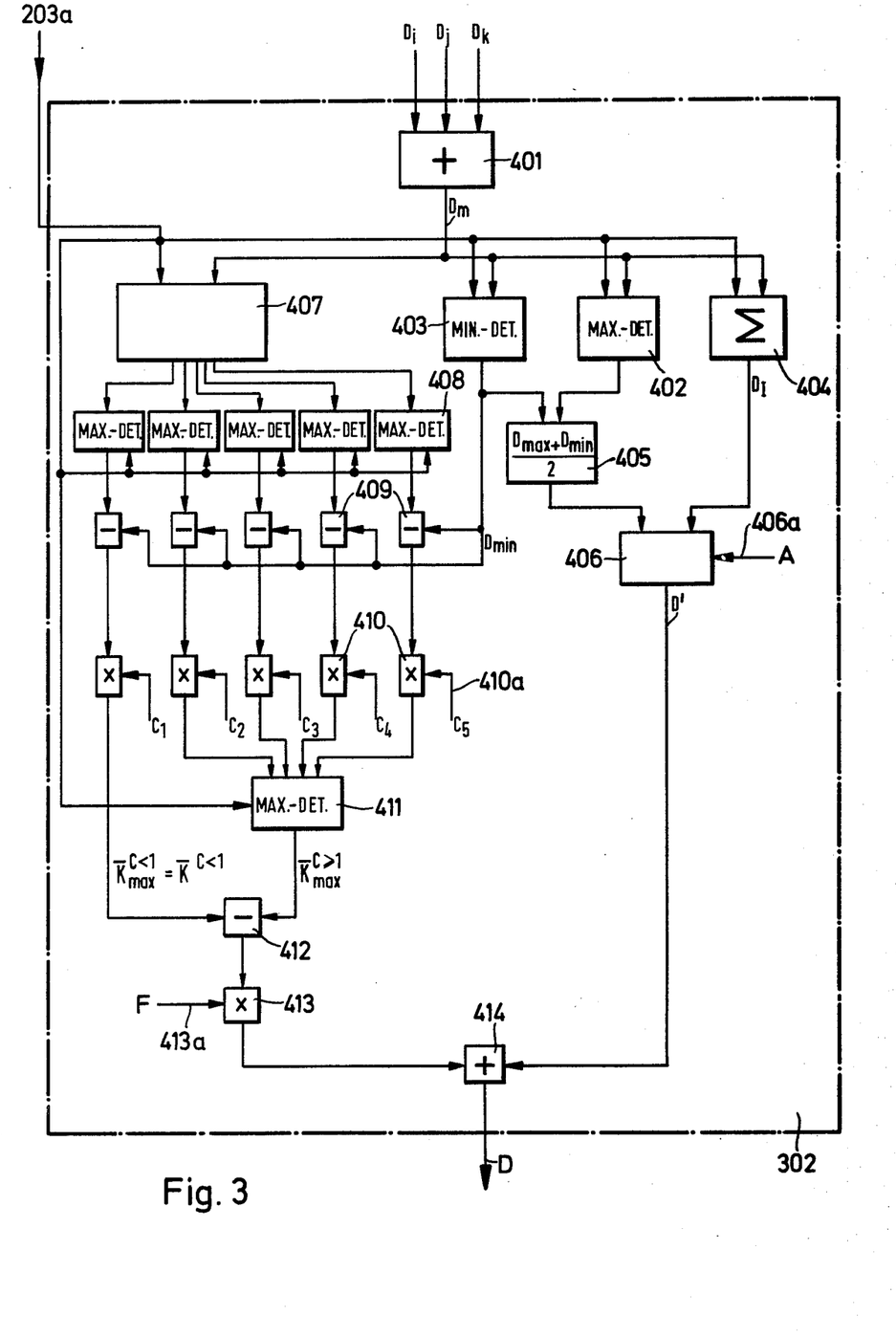
FIG. 3 is a detailed block schematic diagram of a stage of the control system shown in FIG. 2.

FIGS. 2 and 3 show the control station 20 and the process computer 21 in greater detail. The control station 20 comprises a central synch generator 201, a film movement detector 202, a synchronizing stage 203, gate circuits 204 and 205, blanking stages 206 and an exposure control stage 207. The latter is of the type used in printers having integral light measurement and disclosed, for example, in U.S. Pat. No. 3,482,916 and U.S. Pat. No. 3,672,768.

The process computer 21 comprises three logarithmic analogdigital converters 301, a density correction stage 302, a weighting unit 303, subtraction units 304, comparison value forming unit 305, a discriminator 306, gate circuits 307 and 308, a store 309, a counter 310, another gate circuit 311, an averaging unit 312, anoather averaging unit 313, subtraction units 314, adding units 315 and shift registers 316.

For the sake of simplicity, the following description will refer only to density and other values, but of course these values are in the form of appropriate electrical signals in the control circuit.

The synchronous motor 5 for driving the mirror wheel 6 and the stepping motor 18 for film transport are controlled by the synch generator 201, via amplifiers 5' and 18'. The film movement detector 202 stops the film drive motor 18 via the gate circuit 205 when the notch sensor 19 indicates the correct position of a frame in the exposure station. As soon as exposure is over, the exposure control stage 207 delivers a signal to the gate circuit 205 via the line 208 so that the gate 205 opens and re-starts the film transport. The film movement detector 202 also controls the gate circuits 204 and the synchronizing stage 203. The former are opened and pass the scanned values detected by the photo-electric cells 9 to the blanking stages 206 only when the film is in motion (notch sensor 19) and when the notch sensor indicates the start of a frame area. The synchronizing stage 203 receives a line synch pulse from the photoelectric cell 10 and controls the blanking stages 206 so that they divide the scanning lines up into a number of discrete measured points and scan each individual frame of the film strip 1 in the same way so that each measured point of each frame occupies the same geometric position with respect to that frame. There is therefore a clear relationship between the order number of a measured point ($x^{th}$ point in the $y^{th}$ line) and the geometric location of this measured point on each measured frame on the film 1. The synchronizing stage 203 also delivers an end signal at its output 203a when a frame has been completely scanned. This end signal is fed to the integrators 312 and the density correction stage 302 where, after each complete scanning, it re-sets the system to the initial state so that these functional stages are prepared for processing the measured values from the next frame.

The discrete measured analog values generated by the blanking stages 206 are then fed to the process computer 21 where they pass to the logarithmic A/D converters 301 which convert them to digital colour density values $D_i$, $D_j$ and $D_k$. These density values pass to the weighting unit 303, the subtraction units 304, the density correction stage 302 and, via the gate circuits 307, to the averaging units 312. The expression $(aD_i + bD_j + c\,D_k) : (a+b+c)$ is formed in the weighting unit 303 from the three colour densities $D_i$, $D_j$ and $D_k$, for each discrete measured point. The weighting factors can be fed both to the weighting unit itself and to the comparative value forming unit 305 via an input denoted by the arrows 303a. The expression is then subtracted from the colour densities $D_i$, $D_j$ and $D_k$ in the subtraction units 304 and the resulting differences are fed to the discriminator 306, to which the tolerances $d_1$, $d_2$ and $d_3$ can be fed via an input denoted by arrows 306a.

The three colour density values $D_{N_i}$, $D_{N_j}$ and $D_{N_k}$ of the standard or reference negative pass via the input denoted by arrows 305a to the store 309 and the comparison value forming unit 305. In a similar manner to the weighting unit 303 and subtraction units 304, unit 305 forms three different values therefrom, and they are also fed to the discriminator 306. In the latter, these difference values are compared with the difference values formed by the subtraction units 304. If the conditions described herein-before are satisfied, the discriminator passes a signal to the gate circuits 307 and to the counter 310, the former opening and passing the density values of the associated measured point to the averaging units 312 and advancing the counter 310 by one step. In this way all the colour densities of the measured points which are found to be assessable are fed to the averaging units.

The number of assessable measured points is counted by the counter. The counter 310 can be pre-set to a given set-value as indicated by arrow 310a. When this set-value is reached, it delivers a signal and automatically returns to its initial position. In practice, as already indicated above, the counter is set to a value between about 30% and 70% of the total number of measured points. If the number of measured points found to be assessable is less than the pre-set value, the end signal from the synchronizing stage 203 can open the gate circuits 311 so that the latter pass synch pulses from the synch generator to the gate circuits 308 and to the counter 310. On each synch pulse, the three values $D_{N_i}$, $D_{N_j}$, $D_{N_k}$ are read out from the store 309 and passed to the averaging units 312. At the same time, counter 310 counts on one step. As soon as the counter reaches its set-value position, it delivers a signal to the gate circuit 311 to close the latter so that no colour density values can be read out from the store.

The averaging units 312 each form an average from all the colour density values fed to them. These values are again averaged in the averaging unit 313. The last average value formed is then subtracted from the colour density mean values $\overline{D}_i$, $\overline{D}_j$ and $\overline{D}_k$ in the subtraction units 314. The resulting differences $\Delta i, j, k$ are added in the adding units 315 to the end value D formed in the density correction stage 302 from the colour density $D_i$, $D_j$ and $D_k$ of all the measured points, such end value D governing the control of the total neutral density. The resulting three totals ($\Delta i, j, k + D$) represent the equivalent input values (in the case of integral light measurement) for the exposure control stage 207 and are fed to the latter via shift registers 316. The shift registers deliver the input values to the exposure control stage 316 only when the film frame from which these values have been derived has arrived at the exposure station.

FIG. 3 shows the density correction stage 302 in detail. It comprises a weighting unit 401, a maximum detector 402 and a minimum detector 403, an averaging unit 404, another averaging unit 405, a weighting unit 406, a zone decoding unit 407, five zone maximum detectors 408, five subtraction units 409, five multiplication units 410, another maximum detector 411, another subtraction unit 412, another multiplication unit 413 and an adding unit 414.

In the weighting unit 401, the neutral densities $D_m$ are formed from the three colour densities of each measured point in accordance with the formula $D_m = D_B +$ $5D_G + 4D_R$. The averaging unit 404 averages these neutral densities $D_m$ and forms the means density $D_I$ therefrom. The maximum detector 404 detects the maximum density $D_{max}$ while the minimum detector 403 determines the minimum density $D_{min}$. The latter two densities are averaged in an averaging unit 405. The average value formed in this way is combined with the average density $D_I$ according to the formula $D' = A \cdot D_I + (1-A)(D_{max} + D_{min})/2$ in the weighting unit 406. As indicated by arrow 406a, factor A can be introduced or adjusted.

The neutral densities $D_m$ of the discrete measured points are passed to the zone decoding unit 407 which feeds the discrete values $D_m$ to one of the five zone maximum detectors 408 according to the relationship between the associated measured points and the various picture zones, said detectors 408 determining the maximum density from each picture zone. The total minimum density $D_{min}$ is derived from these maximum zone densities in the subtracting units 409 and thus a maximum contrast is formed for each zone. This maximum contrast is multiplied in the multiplication units 410 by weighting factors C which differ for each zone. The weighting factors are adjustable as indicated by the arrows 410a. The maximum detector 411 determines the maximum weighted contrast $\overline{K}_{max}^{c\geq 1}$ from the weighted contrasts of the zones having weighting factors $\geq 1$. The maximum weighting contrast $\overline{K}_{max}^{c<1}$ for the zone having a weighting factor $C<1$ is derived from the maximum weighted contrast in the subtraction unit 412. If there were a number of zones having weighting factors $<1$ an additional maximum detector would have to be provided like the maximum detector 411.

The difference formed in the subtraction unit 412 is multiplied by a factor F in the multiplication unit 413. The factor input is denoted by the arrow 413a. The value multiplied in this way is then added in the adding unit 414 to the value D' formed by the weighting unit 406 and together with the value D' gives the control density D governing the control of the total brightness.

What is claimed is:

1. A method of controlling exposure in the production of photographic prints, comprising scanning an original to be printed point-by-point, determining the neutral density of each picture point of the picture area of said original, dividing up said picture area into a plurality of concentric zones each of which comprises at least two picture points, deriving from the density values of the picture points a first intermediate value representative of the average and/or mean density of the original, determining second intermediate values for each zone from the density values of the picture points in that zone and from the density value in a reference picture point which is the same for all the zones, said second intermediate values being representative of the density contrast between each individual picture point and said reference picture point, weighting said second intermediate values by weighting factors which are associated to each zone and decrease from the innermost zone towards the outermost zone, combining said first and second intermediate values to provide an end value representative of the neutral density of the original and using said end value as input data for controlling density balance when printing said original.

2. A method according to claim 1, wherein the point having the minimum density value is evaluated as the reference picture point.

3. A method according to claim 2, wherein each zone is allocated a weighting factor, of which at least the factor associated with innermost zone is larger than 1 and the factor associated with the outermost zone is less than 1, the maximum weighted contrast obtained by weighting with the associated weighting factor is determined from all the zones having a weighting factor of more than 1 and similarly the maximum weighted contrast is determined from all the zones having a weighting factor of less than 1, and the difference of these two weighted maximum contrast values is used to form the end value.

4. A method according to claim 3, wherein in addition to the difference between the two maximum contrast values the contrast between the picture points of minimum and maximum density is also used to form the end value.

5. A method according to claim 3, wherein values from 0.5 and 2.0 are selected for the weighting factors.

6. A method according to claim 5, wherein the end value E governing the determination of the exposure data is formed in accordance with the instructions:

$$E = A \cdot D_1 + (1-A)\tfrac{1}{2}(D_{max} + D_{min}) + (\overline{K}_{max}{}^{c>1} - \overline{K}_{max}{}^{c<1})$$

where $A$ and $K$ are constant factors, $D_1$ is the area density, $D_{max}$ and $D_{min}$ are the maximum and minimum density of the original and
$\overline{K}_{max}{}^{c>1}$ and $\overline{K}_{max}{}^{c<1}$ are the two maximum weighted contrasts.

7. A method according to claim 6, wherein the values between 0 and 1 are selected for the factor A.

8. A method according to claim 6, wherein values between 0.5 and 2.0, preferably between 0.8 and 1.2 are selected for the factor K.

9. The method according to claim 1, wherein the original is scanned in respect of the densities in the three primary colours and the associated value of the neutral density is determined from the resulting three colour density values at each point of the picture.

10. A method according to claim 9, wherein the neutral densities are formed by weighted averaging of the three colour densities, the weighting factors being so selected that the density in the primary colour blue has the least effect and the density in the primary colour green has the strongest effect in the neutral density.

11. A method according to claim 9, wherein area densities in the three primary colours are determined from the individual colour density values and these area densities are evaluated for controlling the colour balance during exposure in the three primary colours, the picture points which are selected being those which satisfy at least two of the three conditions:

$$D_i - \frac{aD_i + bD_j + cD_k}{a+b+c} \leq D_{N_i} - \frac{aD_{N_i} + bD_{N_j} + cD_{N_k}}{a+b+c} \pm d_1$$

$$D_j - \frac{aD_i + bD_j + cD_k}{a+b+c} \leq D_{N_j} - \frac{aD_{B_i} + bD_{N_j} + cD_{N_k}}{a+b+c} \pm d_2$$

and $$D_k - \frac{aD_i + bD_j + cD_k}{a+b+c} \leq D_{N_k} - \frac{aD_{N_i} + bD_{N_j} + cD_{N_k}}{a+b+c} \pm d_3$$

where $D_i$, $D_j$ and $D_k$ denote the densities of the associated point of the picture in the primary colours, $j$ and $k$, $a$, $b$ and $c$ are constant factors and $d_1$, $d_2$ and $d_3$ are constant density values and $D_{N_i}$, $D_{N_j}$ and $D_{N_k}$ denote the densities in the primary colors $i$, $j$ and $k$ of a reference original, and the points of the picture which do not satisfy these conditions are disregarded in determining the area densities.

12. A method according to claim 11, wherein if the number of picture points selected for determining the area densities is less than a specific percentage of all the picture points then a number of points of the reference original supplementing the number of selected picture points to make up the said percentage is used in addition to the selected picture points to determine the area densities.

13. A method according to claim 11, wherein the area densities in the individual primary colours are determined by an averaging method from the densities of the points used for determining the area density.

14. A method according to claim 13, wherein an unweighted averaging method is used.

15. A method according to claim 11, wherein for each primary colour the difference is formed between the area density in the associated primary colour and the arithmetic mean of the area densities in all three primary colours and these three differences are evaluated to control the relationship between the proportions of the three primary colours in the print.

16. A method according to claim 11, wherein the three weighting factors $a$, $b$ and $c$ are selected in the range from 0 to 1.

17. A method according to claim 16, wherein all three weighting factors $a$, $b$ and $c$ are selected to be equal.

18. A method according to claim 16, wherein the two weighting factors $a$ and $c$ are selected to be zero.

19. A method according to claim 11, wherein none of the possible relationships between any two of the three weighting factors $a$, $b$ and $c$ is made greater than 10:1.

20. A method according to claim 11, wherein only those picture points which satisfy all three selection conditions are selected.

* * * * *

UNITED STATES PATENT AND TRADEMARK OFFICE
CERTIFICATE OF CORRECTION

PATENT NO.  : 4,092,067
DATED       : May 30, 1978
INVENTOR(S) : Walter Grossmann It is certified that error appears in the above–identified patent and that said Letters Patent are hereby corrected as shown below:

Column 11, line 24, that portion of the formula that reads "$+ (\bar{K}_{max}^{c>1} - K_{max}^{c<1})$" should read -- $+K \cdot (\bar{K}_{max}^{c>1} - \bar{K}_{max}^{c<1})$ --.

Signed and Sealed this

Sixth Day of March 1979

[SEAL]

Attest:

RUTH C. MASON
*Attesting Officer*

DONALD W. BANNER
*Commissioner of Patents and Trademarks*